Figure 1:
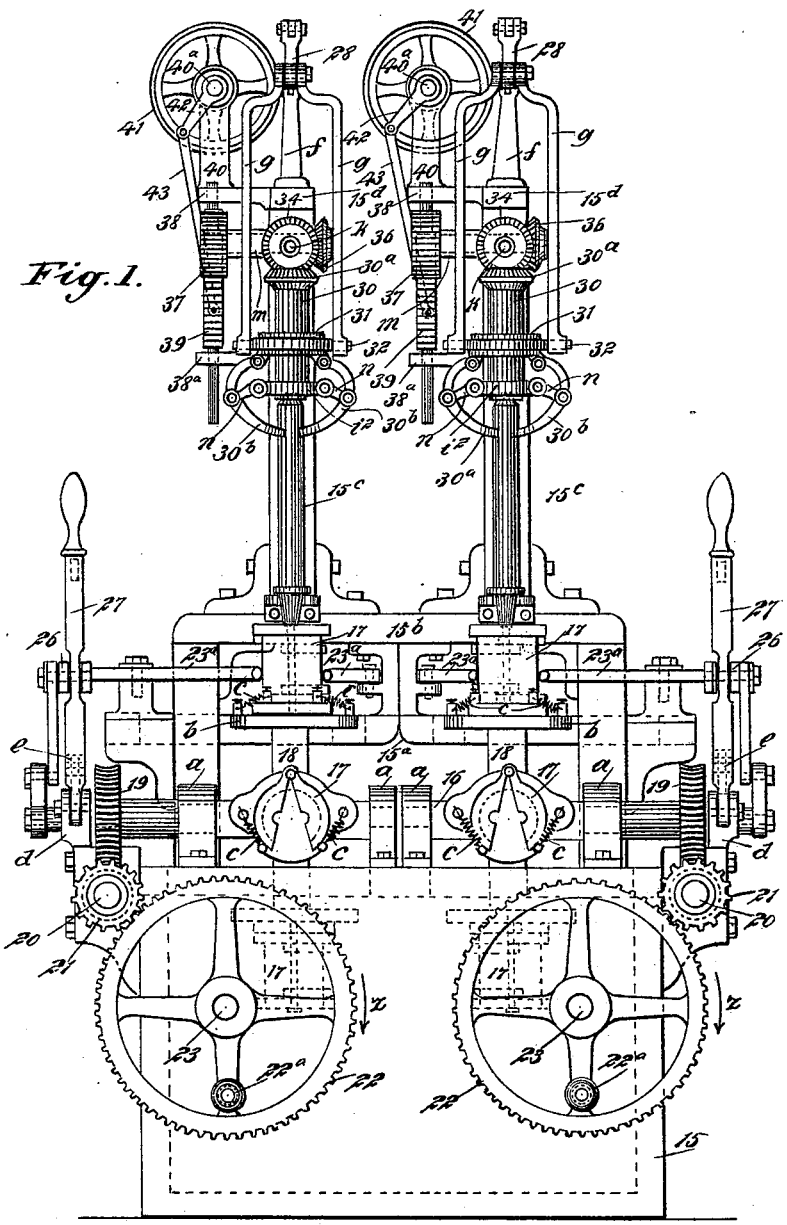

No. 631,624. Patented Aug. 22, 1899.
L. H. DOLAN.
GLASS BLOWING MACHINE.
(Application filed Apr. 20, 1899.)
(No Model.) 6 Sheets—Sheet 1.

WITNESSES:

INVENTOR
Lawrence H. Dolan.
BY
ATTORNEYS.

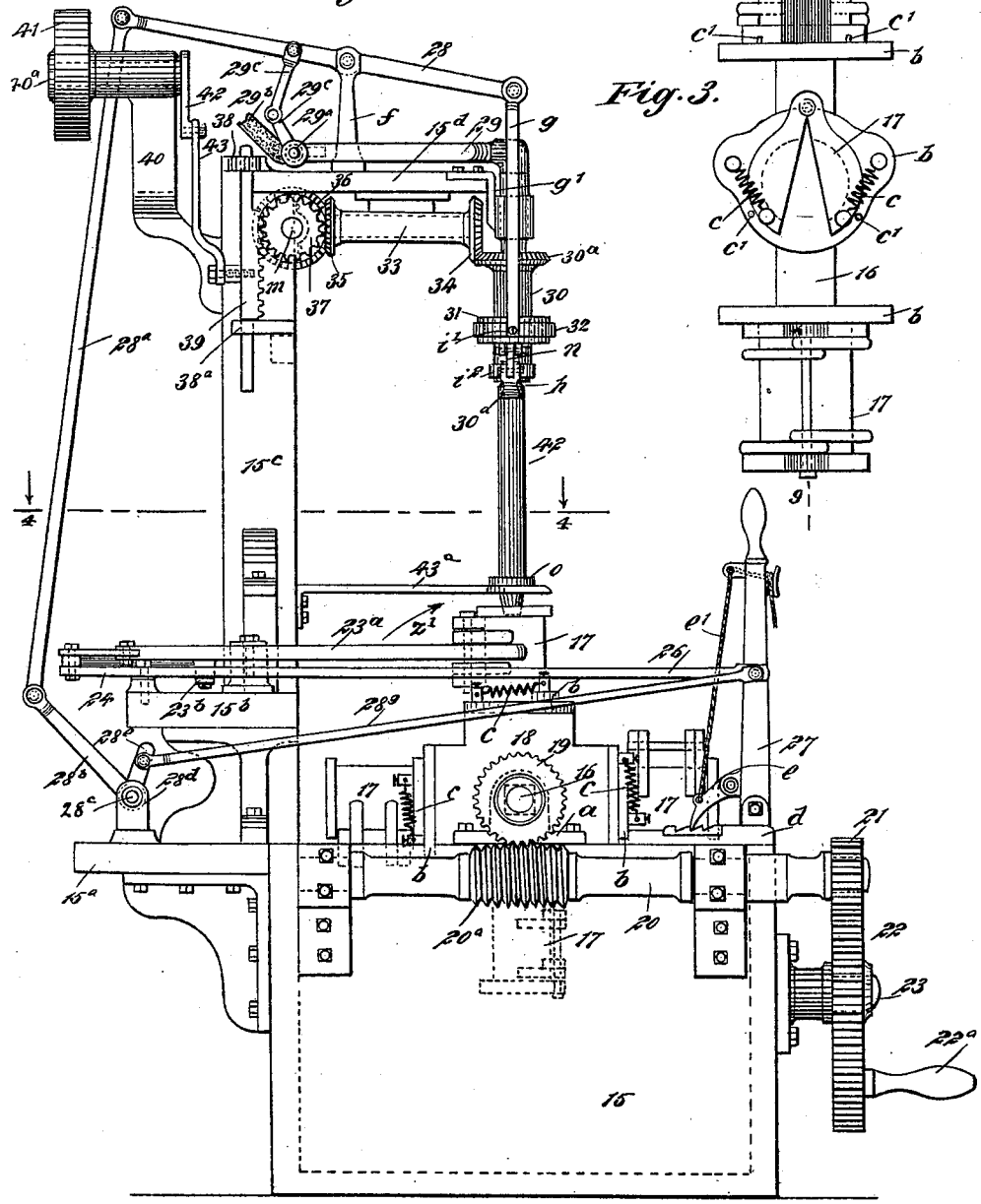

No. 631,624. Patented Aug. 22, 1899.
L. H. DOLAN.
GLASS BLOWING MACHINE.
(Application filed Apr. 20, 1899.)

(No Model.) 6 Sheets—Sheet 3.

WITNESSES:
Wm. L. Patton
Julius Luk.

INVENTOR
Lawrence H. Dolan
BY
Munn
ATTORNEYS.

No. 631,624. Patented Aug. 22, 1899.
L. H. DOLAN.
GLASS BLOWING MACHINE.
(Application filed Apr. 20, 1899.)
(No Model.) 6 Sheets—Sheet 4.
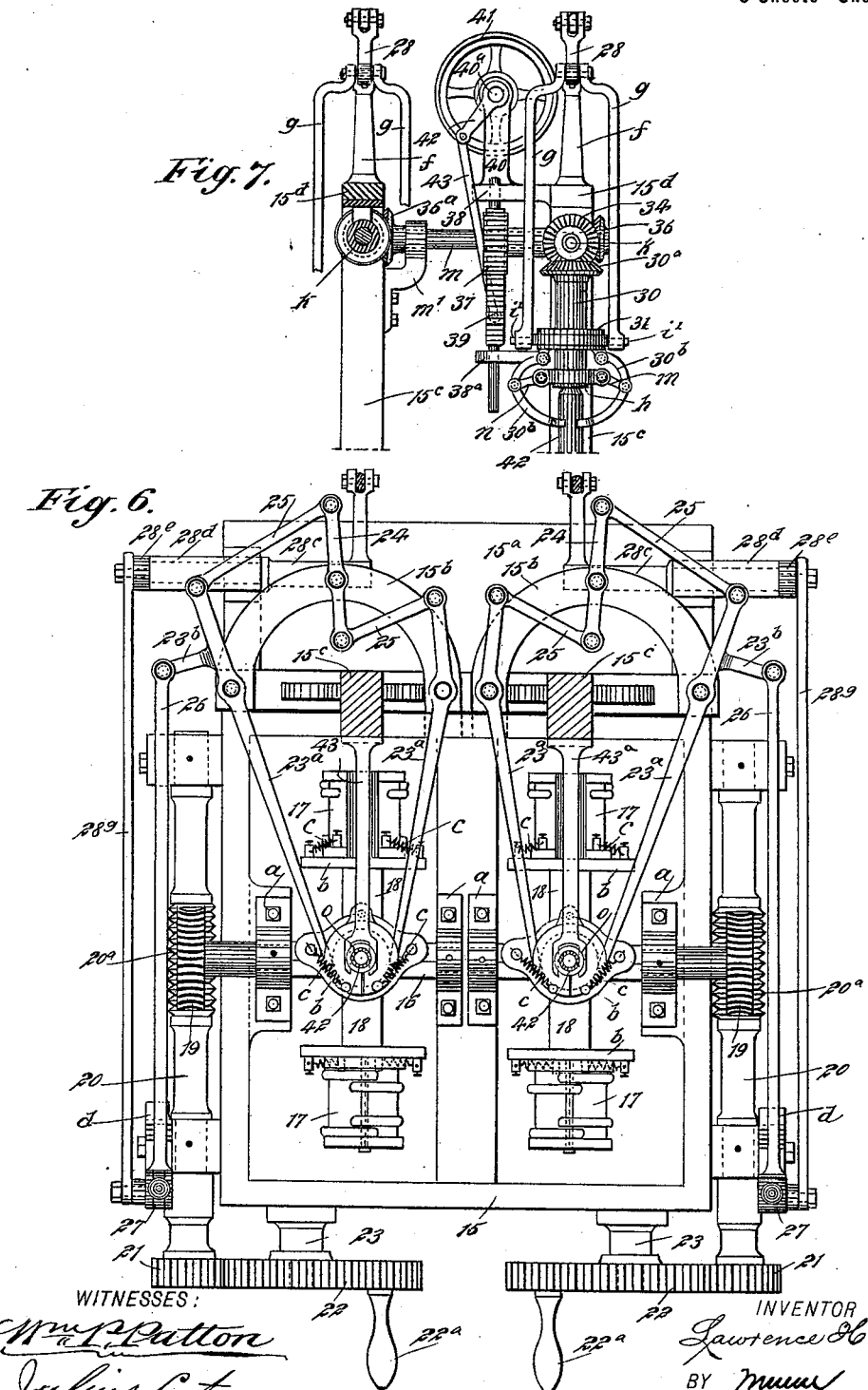
WITNESSES:
INVENTOR
Lawrence H. Dolan
BY
ATTORNEYS.

No. 631,624. Patented Aug. 22, 1899.
L. H. DOLAN.
GLASS BLOWING MACHINE.
(Application filed Apr. 20, 1899.)
(No Model.) 6 Sheets—Sheet 5.

WITNESSES:

INVENTOR
Lawrence H. Dolan.
BY
ATTORNEYS.

No. 631,624. Patented Aug. 22, 1899.
L. H. DOLAN.
GLASS BLOWING MACHINE.
(Application filed Apr. 20, 1899.)
(No Model.) 6 Sheets—Sheet 6.
*Fig. 9.*
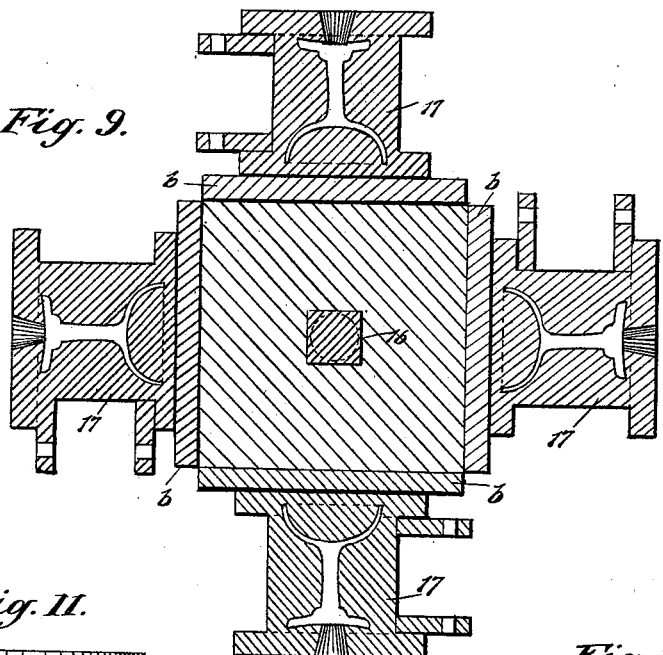
*Fig. 11.*
*Fig. 12.*
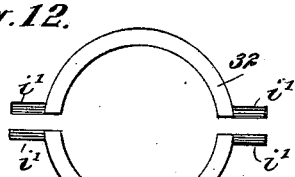
*Fig. 10.*
*Fig. 14.*
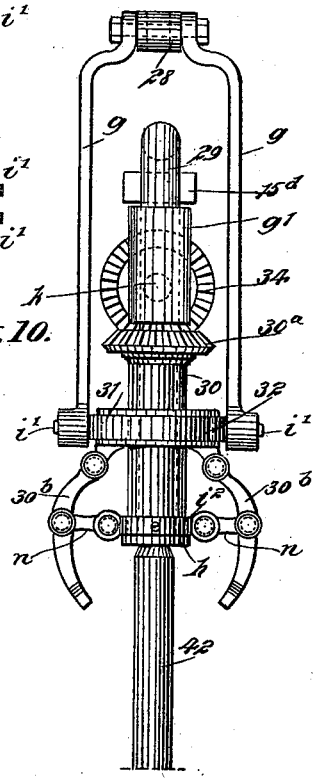
*Fig. 13.*
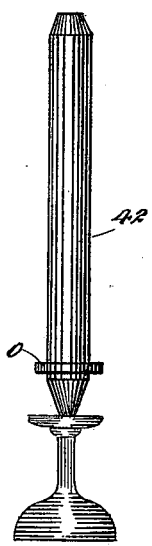
WITNESSES:
Wm P Patton
Julius ...
INVENTOR
Lawrence H Dolan
BY
ATTORNEYS.
THE NORRIS PETERS CO., PHOTO-LITHO., WASHINGTON, D. C.

UNITED STATES PATENT OFFICE.

LAWRENCE H. DOLAN, OF PENDLETON, INDIANA, ASSIGNOR OF ONE-HALF TO LOUIS KAUFFELD, OF SAME PLACE.

GLASS-BLOWING MACHINE.

SPECIFICATION forming part of Letters Patent No. 631,624, dated August 22, 1899.

Application filed April 20, 1899. Serial No. 713,784. (No model.)

*To all whom it may concern:*

Be it known that I, LAWRENCE H. DOLAN, of Pendleton, in the county of Madison and State of Indiana, have invented a new and Improved Glass-Blowing Machine, of which the following is a full, clear, and exact description.

This invention is a novel machine for blowing into form small articles of glass, and has for its object to provide a device of the indicated character which will greatly facilitate the operation of blowing small glassware and enable the rapid production of such articles in perfect condition.

The invention consists in the novel construction and combination of parts, as is hereinafter described, and defined in the claims.

In the drawings which illustrate my invention similar characters of reference indicate corresponding parts in all the figures.

Figure 4:
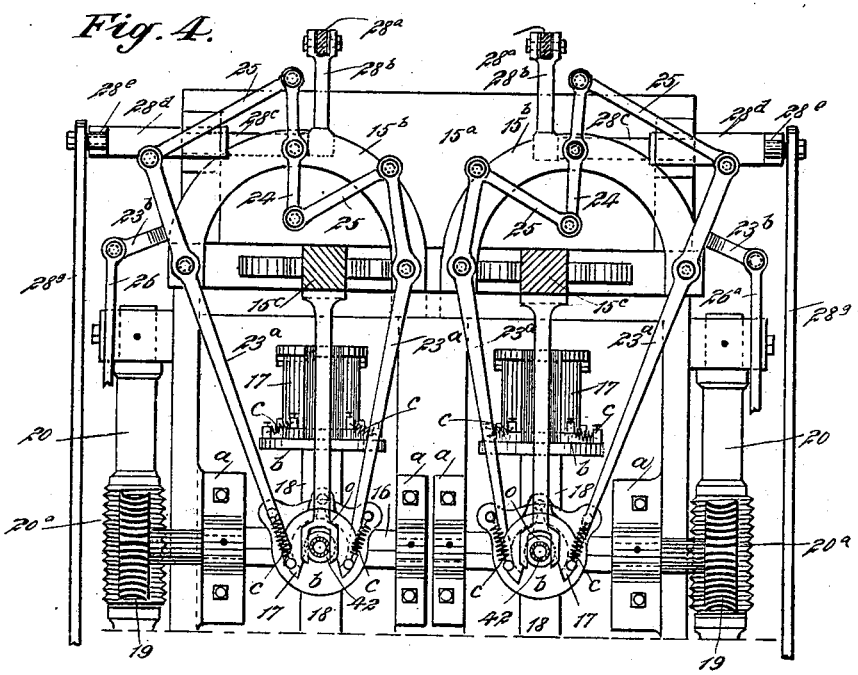
Figure 5:
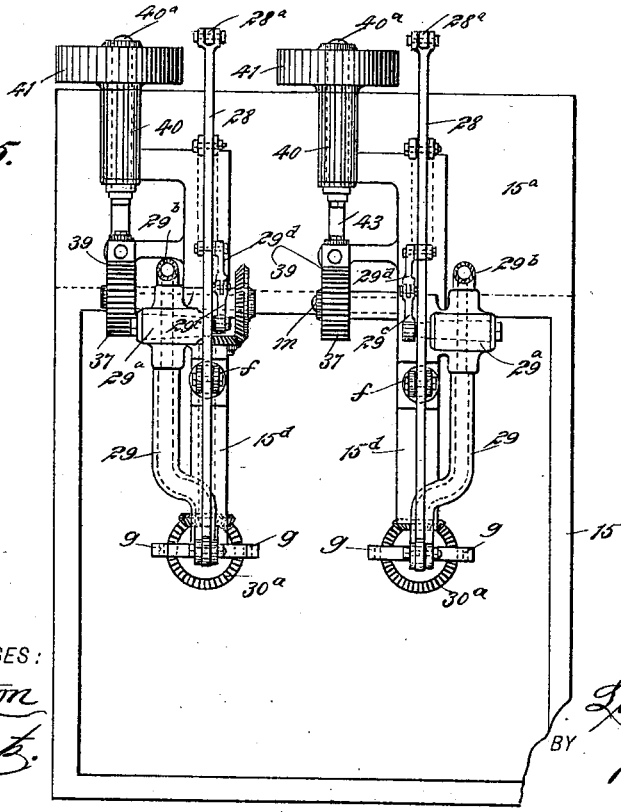
Figure 8:
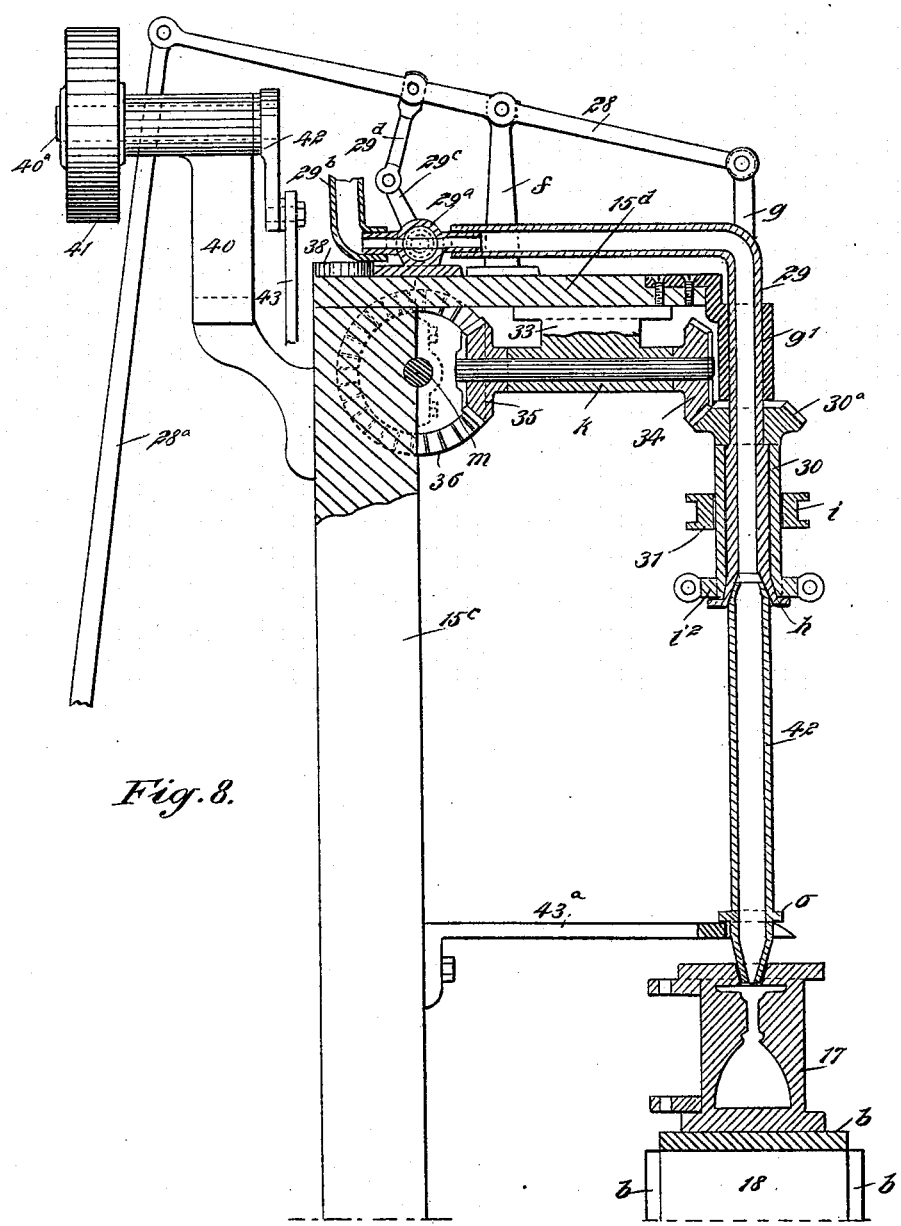

Figure 1 is a front elevation of the improved glass-blowing machine. Fig. 2 is a side elevation of the same. Fig. 3 is an enlarged plan view of a gang of glass-molds that embody features of the invention. Fig. 4 is a partly-sectional plan view of the rear portion of the machine in duplicate, showing parts adjusted to permit the top molds to open, the section being substantially on the line 4 4 in Fig. 2. Fig. 5 is a top plan view of the glass-blowing machine in duplicate arranged for convenient use independently. Fig. 6 is a partly-sectional plan view of the duplicate machines, having parts adjusted to close the top molds. Fig. 7 is a partly-sectional front view of the upper portions of two of the improved molding devices arranged side by side and one adapted to receive motion from the other. Fig. 8 is an enlarged partly-sectional side view of the air-supply mechanism employed. Fig. 9 is an enlarged sectional side view of a gang of glass-molds and their support, taken substantially on the line 9 9 in Fig. 3. Fig. 10 is an enlarged front view of details of the rotating device for the blowpipe of one of the duplicate machines. Figs. 11, 12, and 13 are detail views of a two-part yoke-ring, which is part of the device shown in Fig. 10; and Fig. 14 is a detached side view of one of the blowpipes, showing a finished piece of glassware connected thereto after removal from a forming-mold.

In carrying into effect the features of invention it is of advantage to arrange a plurality of the improved glass-blowing machines side by side over a water-holding tank, so that a proper number of these machines may be operated conveniently by a glass-blower and one assistant.

It is found that four machines may with ease be operated by two persons for the rapid and perfect production of small pieces of glassware, such as wine-glasses, goblets, lamp-chimneys, and other articles which may be formed by an air-blast and rotary motion of the article while in process of formation within a suitable mold.

For illustration two similar machines having the improvements are represented in the drawings, and as these are alike the description of one, which will now be given, will suffice for both.

On the top of the water-tank 15, that is of sufficient dimensions for its service and at a proper distance from the front edge, a transverse shaft 16 is supported to rotate in boxes $a$, that are affixed in alinement upon the tank. A set of four molds 17 is radially disposed upon the shaft 16, and each mold is formed of two equal sections that are hinged together near one edge of each of said sections. Preferably the sets of molds 17 are projected oppositely in pairs from the body of the shaft 16, and each mold is seated upon a base-plate $b$, that is secured upon one side of the square center block 18, as best shown in Fig. 9. The two-part molds 17 may with advantage be pivotally arranged each on its respective base-plate $b$, so as to spread open toward the front side of the tank 15 when a mold is vertically positioned and thus becomes the uppermost one of the gang. By means of a pair of springs $c$ the half-sections of each mold 17 are held normally spread apart a suitable distance that may be defined by stop-pins which project up from the base-plate $b$, as shown at $c'$ in Fig. 3.

It is necessary that the gang of molds 17 be adapted for change of position, so that each one may successively be rendered upright and open forwardly, as before mentioned. To this end the outermost extremity of the shaft 16 carries a worm-gear 19, which is meshed with the worm 20ª, formed upon the shaft 20, held to rotate at the side of the water-tank 15. On the forward end of the worm-shaft 20 a pinion 21 is secured that meshes with the driving gear-wheel 22, held to rotate on a stud 23, projected from the front wall of the water-tank 15, said gear-wheel having a crank-handle 22ª thereon for its rotatable movement as occasion may require. It will be evident that a rotatable movement of the gear-wheel 22 in the direction of the arrow $z$ in Fig. 1 will be adapted to move the gang of molds 17 in the direction of the arrow $z'$, (shown in Fig. 2,) and thus dispose the molds separately at the top of the set or directly over the shaft 16.

Upon the rear side of the water-tank 15 a bracketed table 15ª projects, upon which is supported a horizontal frame 15ᵇ at a proper distance above the tank, and from the frame 15ᵇ a frame-post 15ᶜ is upwardly extended, having sufficient height for support of working parts that are hereinafter described. Two mold-closing levers 23ª are pivoted upon the upper side of the horizontal frame 15ᵇ near the rear ends of said levers, their longer members projecting forwardly and toward the gang of molds 17, so that they may bear upon adjacent sections of a mold that is uppermost, when pressed toward said mold-sections, and thus close the same against the stress of the springs $c$. A lever 24, which is pivoted between its ends upon the frame 15ᵇ, has said ends respectively pivoted upon adjacent ends of two link-bars 25, the opposite ends of the latter being jointed upon the rear ends of the closing-levers 23ª, as is clearly shown in Figs. 4 and 6. Between the pivot connection of the outermost closing-lever 23ª with the frame 15ᵇ and the rear end of said closing-lever a short arm 23ᵇ outwardly projects, and upon the outer end of this arm the rear end of the pusher-bar 26 is jointed. The pusher-bar 26 extends forwardly and at its remaining end is pivoted upon the upright lever 27, that is fulcrumed at its lower end upon a bracket $d$, seated upon the side of the tank 15, as best shown in Fig. 2. Teeth at suitable intervals are cut in the top face of the bracket $d$, with which the toe of the pawl $e$ will engage, said pawl being pivoted upon the lower portion of the lever 27, so that the pawl is adapted to retain the latter at a desired point of rocking adjustment. From the pawl $e$ a flexible connection $e'$ extends upwardly to engage with and be secured upon the upper portion of the lever 27 to permit the pawl to be readily lifted by a manipulation of the cord $e'$; but it is obvious this feature may be changed or dispensed with, if desired.

At the upper end of the post 15ᶜ the horizontal frame-piece 15ᵈ is held by its rear portion so as to project forwardly above the gang of molds 17. Upon the frame-piece 15ᵈ a standard $f$ is erected whereon the elongated rocking bar 28 is pivoted near its center of length. Two like yoke members $g$ are jointed at their upper ends upon the front extremity of the rockable bar 28 and hang pendent therefrom. An air-tube 29 is held to depend from the front end of the frame-piece 15ᵈ by a tubular bracket-arm $g'$, as is clearly indicated in Figs. 2 and 8. Upon the true exterior of the upright air-tube 29 the sleeve 30 is loosely mounted, but is prevented from removal at the lower end of said tube by a fixed collar $h$ on said extremity. The slide-head 31 is rotatably located upon the true cylindric exterior of the sleeve 30, and a peripheral groove $i$, formed in the slide-head, receives the two sections of the bisected ring 32. (Shown applied in Fig. 10 and detached in Figs. 11, 12, and 13.) Two half-cylindric journal ends $i'$ are formed on the ends of the half-sections of the two-part ring 32, which ends provide completely cylindrical journals when the half-sections of said ring are placed in the groove $i$, which journals have engagement with the laterally-perforated ends of the yoke members $g$ when the parts of the device are assembled. A collar $i^2$ is secured upon the lower end of the sleeve 30, which will have seated engagement with the fixed collar $h$ and afford a support whereon the sleeve may be rotated. At the upper end of the sleeve 30 the bevel-gear 30ª is affixed thereon or may be formed integral therewith.

A hanger 33 in tubular form depends from the frame member 15ᵈ for the rotatable support of the spindle $k$, on the outer and inner ends of which are affixed, respectively, the bevel-gears 34 35, the outer gear 34 having meshed engagement with the bevel-gear 30ª, as clearly shown in Figs. 2 and 8. On one end of a short shaft $m$, held to rotate on the frame-post 15ᶜ, the bevel-gear 36 is secured, so as to mesh with the bevel-gear 35 on the spindle $k$, and upon the other end of the shaft $m$, that is shown extended toward the left side of Fig. 1, a spur-pinion 37 is fixed. Upon arms 38 38ª, which extend from the post 15ᶜ in the same vertical plane and suitably spaced apart, the upper and lower end portions of a rack 39 are respectively held to slide, but not to rotate, said rack being meshed with the spur-pinion 37. In the bracketed box 40, which extends from the rear side of the post 15ᶜ, a spindle 40ª is rotatably supported, and on the projected rear end of the spindle a pulley 41 is secured, a crank-arm 42 being affixed upon the extended front end of said spindle 40ª. On the outer end of the crank-arm 42 a pitman-rod 43 is pivoted and extends downwardly, so that the lower end of the pitman-rod may be pivoted upon the rear side of the rack 39. It will be seen that when rotary motion is communicated from any suitable source of power and motion to the pulley 41 the reciprocation of the rack 39 thus produced will rotate the spindle $k$, first in one direction and then in an opposite direction, a like rotary movement being communicated to the sleeve 30 through its geared connection with the spindle $k$.

On the collar $i^2$, that is fixed upon the lower end of the sleeve 30, the upper ends of two gripper-arms $30^b$ are pivoted, and between the ends of said gripper-arms one end of a short link $n$ is pivoted, the other end of each link being pivoted upon the collar $i^2$ at opposite points.

The rear end of the elongated rocking bar 28 is pivoted upon the upper end of the long connecting-rod $28^a$, which extends downwardly at the rear of the machine and at the lower end is jointed upon the outer end of an arm $28^b$, secured upon a rock-shaft $28^c$, journaled in a box $28^d$, supported on the table $15^a$, as shown in Figs. 4 and 6. Another arm $28^e$ projects at the outer end of the shaft $28^c$, and upon its end the rear extremity of the connecting-rod $28^g$ is pivoted, the forward end of the latter being pivoted upon the upright lever 27 adjacent to the end of the pusher-bar 26. As the sleeve 30 is held from longitudinal movement, but free to rotate on the air-tube 29, it will be evident that a rearward rocking movement of the lever 27 will depress the rear end of the rocking bar 28, which will elevate the yoke members $g$ and slide the head 31 upwardly on the sleeve 30, which movement will spread the gripper-arms $30^b$ apart or into the position shown in Fig. 10, a forward movement of said lever 27 serving to close the gripper-arms by depression of the slide-head 31.

Referring to the two-part molds 17, the interior construction of which is indicated in Figs. 8 and 9, it will be seen that each half-section of a mold is recessed to afford a matrix that represents the contour of one half of the article that is to be shaped in the mold, and a perforation is formed in the upper end of each mold, one half in each section, to permit the introduction of the lower end of a blowpipe. Preferably each set or gang of four molds 17 have similar cavities therein, so that an article of glassware having a certain design represented by the matrices of the four molds of a gang may be continuously produced while the gang of molds having this design is in place.

It is to be understood that the gang of molds is to be adapted for removal from the shaft 16 by a detachment of the center block 18 from said shaft and that a gang of molds having matrices of a different design may be substituted for those removed, so that small glassware of various styles may be formed on the machine.

To enable the rapid and easy blowing of molten glass into form, the air-supply tube 29 is extended rearwardly upon the frame member $15^d$ and connected with a valve $29^a$, that is also in connection with an air-supply pipe $29^b$, (shown broken away in Figs. 1 and 8, but which in service is extended to a source of compressed air.) An arm $29^c$ is extended from the gate of the valve $29^a$ and loosely connected with a link $29^d$, that is pivoted by its upper end upon the rocking bar 28, rearwardly of its support $f$, so that the valve will be opened when the lever 27 is rocked forwardly and the gripper-arms $30^b$ are moved to close them. A blowpipe 42 is provided for the use of the glass-blower, and, as represented best in Fig. 8, this pipe is rendered coniform at each end, and thus adapted for easy connection with the air-tube 29 and perforated upper end of any one of a gang of molds 17. To facilitate the introduction of the blowpipe, as shown in Fig. 8, the lower end of the air-supply tube 29 may be cupped or conically enlarged in the bore, so that the conical upper end of the blowpipe will fit therein with an air-tight joint. There is a collar $o$ formed on the blowpipe 42 near its lower end to loosely seat upon the forked outer end of a spring bracket-arm $43^a$, that projects from the post $15^e$ forwardly and over the uppermost mold 17 of a gang. The series of four machines or a less number is under control of the glass-blower's assistant, while the glass-blower charges the lower ends of the blowpipe of each machine successively with molten glass when the operation of glass-blowing is being conducted. The assistant manipulates the gearing connected with the gang of molds 17 so as to dispose one mold vertically over the shaft 16, leaving said two-part mold open. The glass-blower now places the blowpipe 42, that has been charged with molten glass at its lower end, in position, so that said lower end will be disposed between the two sections of the open mold and thus centrally maintained by the spring-arm 43. The assistant now starts the rotation of the sleeve 30, and this correspondingly revolves the gripper-arms $30^b$. Simultaneously the lever 27 is moved forwardly a proper degree, which will close the gripper-arms upon the blowpipe 42 and open the valve $29^a$ for the supply of air under pressure to the blowpipe. The blowpipe is rotated rapidly by the gripper-arms $30^b$, and the force of air expelled from the lower end of the blowpipe will begin to expand the molten glass that is upon the lower end of the blowpipe. As the molten glass dilates in the space between the two parts of the mold the manipulation of the lever 27 serves to gradually close said mold, owing to the enforced pressure of the two closing-levers 23 upon the mold-sections. The closure of the mold 17 gradually while the glass is being blown into it and at the same time rapidly rotated in reversed directions serves to highly polish the piece of ware and finally give it perfect form within the mold, and it may be removed along with the blowpipe, as indicated in Fig. 14. The glass-blower has now placed a charged blowpipe in the top mold of an adjacent machine, and this receives the attention of the assistant after he has opened the used mold and brought another one up into vertical position. As the used molds pass down into the tank 15 they are cooled by the water therein, so that the molds are always in serviceable condition.

The operation that has been described may be indefinitely continued, and by expert labor be rapidly conducted, the finished ware being much superior to such as is formed in the ordinary way.

In Fig. 7 is shown a slight modification of construction which adapts the rotating device of one machine to be utilized for the revolution of the spindle $k$ and attachments upon an adjacent machine. To this end the shaft $m$ is extended toward the post $15^c$ of the adjacent machine, and may be supported by a bracket-box $m'$ thereon, a bevel-gear $36^a$ on this extended end of shaft $m$ having meshed engagement with a like gear on the rear end of the spindle $k$ on the adjacent machine, whereby the reciprocation of the toothed rack 39 by means already described will, through the spur-pinion 37, cause said spindle to alternately revolve in opposite directions for actuation of the blowpipe of the adjacent machine.

Having thus described my invention, I claim as new and desire to secure by Letters Patent—

1. The combination of a plurality of two-part molds which are spring-actuated to hold them open normally, a supported rotatable shaft whereon the molds are radially supported, and means to turn the shaft so as to successively dispose one mold uppermost, of a mold-closing device controlled by a lever, a rack and pawl directly connected with said lever to hold it locked when the uppermost mold is closed, an air-supply pipe, and a blowpipe adapted to engage one end with the air-supply, and the lowermost end with the closed sections of the uppermost mold.

2. The combination with a water-tank, a transverse shaft rotatable on said tank, and means to revolve said shaft, of a plurality of two-part hinged molds radially mounted on the shaft, springs for each mold that normally hold sections of each mold open, two closing-levers adapted to rock toward and from the sections of a mold which is uppermost, means to move said levers, a controlled air-supply, and a blowpipe detachably connected to said air-supply.

3. The combination with a supported two-part mold the sections of which are hinged together, means to hold the mold-sections open normally, a device adapted by manipulation to close the mold-sections, a rack, and a pawl adapted to hold the mold temporarily closed, of an air-supply pipe, a detachable spring-supported blowpipe which will engage one end with the air-supply and with the lower end enter a perforation in the top of the mold, and means to rotate the blowpipe.

4. In a glass-blowing machine, the combination with a frame, an air-supply pipe thereon, and a mold, of a blowpipe having a collar near its lower end, a forked spring-bracket arm projecting horizontally from the frame over the mold, and adapted to engage beneath the collar to effect connection of the blowpipe with the air-supply pipe and mold, a blowpipe-gripping device, and means to rotatably actuate said device and the blowpipe in opposite directions.

5. In a glass-blowing machine of the character described, the combination with a valve-controlled air-supply pipe, a mold having two spring-controlled sections, a detachable blowpipe having a collar near the lower end and engaging the upper end thereof with the air-supply, and a supported bracket-arm forked at the outer end to receive the pipe and support it by the collar thereon, of a device having two pivoted pendent arms adapted to grip the blowpipe between said arms, rotating mechanism for the gripping device rendered active when the valve of the air-supply is opened, and mechanism which by manipulation will simultaneously close the mold-sections, open the air-valve, and start the blowpipe to rotating.

6. In a glass-blowing machine of the character described, the blowpipe-rotating mechanism consisting essentially of a pendently-hung yoke, a block slidably supported thereon, a ring loosely engaging the slide-block and carried by the lower ends of the yoke, two gripping-arms hung from the slide-block whereon they are adapted to rock toward and from each other when the slide-block is reciprocated, an upright slidably-supported rack, a rotatable spindle, a pinion on said spindle engaging the rack, and gearing adapted to transmit rotary motion from the spindle to the slide-block and the gripping-arms thereon.

LAWRENCE H. DOLAN.

Witnesses:
HORACE GOODRICH,
HOMER N. MOTSINGER.